US011507200B2

(12) United States Patent
Chen

(10) Patent No.: US 11,507,200 B2
(45) Date of Patent: Nov. 22, 2022

(54) KVM DEVICE SUPPORTING TRANSMISSION OF SUPER SPEED USB SIGNAL AND DISPLAYPORT VIDEO SIGNAL

(71) Applicant: ACTION STAR TECHNOLOGY CO., LTD., New Taipei (TW)

(72) Inventor: Wen-Pin Chen, Taoyuan (TW)

(73) Assignee: ACTION STAR TECHNOLOGY CO., LTD., New Taipei (TW)

( * ) Notice: Subject to any disclaimer, the term of this patent is extended or adjusted under 35 U.S.C. 154(b) by 43 days.

(21) Appl. No.: 17/352,216

(22) Filed: Jun. 18, 2021

(65) Prior Publication Data

US 2021/0397269 A1    Dec. 23, 2021

Related U.S. Application Data

(60) Provisional application No. 63/042,617, filed on Jun. 23, 2020.

(51) Int. Cl.
*G06F 3/023* (2006.01)
*G06F 13/40* (2006.01)
*G06F 13/42* (2006.01)

(52) U.S. Cl.
CPC .......... *G06F 3/023* (2013.01); *G06F 13/4022* (2013.01); *G06F 13/4282* (2013.01); *G06F 2213/0042* (2013.01)

(58) Field of Classification Search
None
See application file for complete search history.

(56) References Cited

U.S. PATENT DOCUMENTS

| 2009/0198848 | A1* | 8/2009 | Chien | G06F 3/023 710/72 |
| 2017/0046289 | A1* | 2/2017 | Hundal | G06F 13/4022 |
| 2018/0239732 | A1* | 8/2018 | Yang | G06F 13/4022 |
| 2020/0226087 | A1* | 7/2020 | Sun | H04N 21/442 |

* cited by examiner

*Primary Examiner* — Matthew Yeung

(57) ABSTRACT

A KVM device supporting transmission of SuperSpeed USB signal and DisplayPort video signal is disclosed. The KVM device comprises a first USB Type-C connector, a first USB Type-C switch, a second USB Type-C connector, a second USB Type-C switch, a USB switch, a video switch, a control unit, a video connector, and at least one USB connector. When using this KVM device, the first USB Type-C connector and the second USB Type-C connector are electrically connected to a host electronic device through a first USB Type-C cable and a second USB Type-C cable, respectively. Therefore, the KVM device transmits DisplayPort video signal between the host computer and an external display device that is coupled to the video connector. Moreover, the KVM device also transmits SuperSpeed USB signal between the host computer and an external electronic device that is coupled to the USB connector.

17 Claims, 9 Drawing Sheets

KVM DEVICE SUPPORTING TRANSMISSION OF SUPER SPEED USB SIGNAL AND DISPLAYPORT VIDEO SIGNAL

CROSS-REFERENCE TO RELATED APPLICATIONS

This application claims benefits of U.S. Provisional Patent Application Ser. No. 63/042,617 for "Transmitting video signals and USB signals method", filed Jun. 23, 2020. The contents of which are hereby incorporated by reference in its entirety for all purposes.

BACKGROUND OF THE INVENTION

1. Field of the Invention

The present invention relates to the technology field of KVM devices, and more particularly to a KVM device supporting transmission of SuperSpeed USB signal (e.g., USB 3.0/3.1) and DisplayPort video signal (e.g., DisplayPort 1.3/1.4).

2. Description of the Prior Art

With the advance of wired and wireless communication technologies, Internet has become an indispensable part of people's lives. Internet brings convenience such as online shopping and communication across the ocean, etc. The large amount of data communication cannot be accomplished by individual servers, and multiple servers cooperating with each other are used to provide fast operations. To centrally manage servers, management personnel use KVM (keyboard, video, mouse) switches as control devices, which allows using one set of user terminal (keyboard, monitor, mouse) to control and manage multiple servers including their power supply and other settings. In addition, extenders are used to extend the signal transmission range, allowing remote control of servers, to improve space utilization efficiency.

Nowadays, because USB Type-C connector has gradually become the mainstream USB connector, computers in the future may merely equipped with USB Type-C connectors. Accordingly, a KVM device including USB Type-C interface is therefore developed. FIG. 1 shows a block diagram of the KVM device including USB Type-C interface. As FIG. 1 shows, the KVM device 100 comprises a first USB Type-C connector 101, a second USB Type-C connector 102, a video connector 103, a plurality of USB connectors 104, a first USB Type-C switch 105, a second USB Type-C switch 106, a control unit 107, a video switch 108, and a USB switch 109. In which, The control unit 107 is electrically coupled to the first USB Type-C switch 105, the second USB Type-C switch 106, the video switch 108, and the USB switch 109.

As described in more detail below, the first USB Type-C connector 101 is electrically coupled to the first USB Type-C switch 105, and the second USB Type-C connector 102 is electrically coupled to the second USB Type-C switch 106. On the other hand, the USB connectors 104 are electrically coupled to the USB switch 109, and the video connector 103 is electrically coupled to the video switch 108. As FIG. 1 shows, first host computer H1 is electrically connected to the first USB Type-C connector 101 through a first USB Type-C cable L1a, and second host computer H2 is electrically connected to the second USB Type-C connector 102 through a second USB Type-C cable L2a. Moreover, As FIG. 1 shows, the first USB Type-C connector 101 is electrically connected to the first USB Type-C switch 105 through a third USB Type-C cable L11, and the second USB Type-C connector 102 is electrically connected to the second USB Type-C switch 106 through a fourth USB Type-C cable L12.

Engineers skilled in the field of USB technologies certainly know that, there are four pairs of SuperSpeed signal transmitting lanes (i.e., Tx1+, Rx1+, Tx1−, Rx1−, Tx2+, Rx2+, Tx2−, Rx2−) provided in the first USB Type-C cable L1, the second USB Type-C cable L3, the third USB Type-C cable L11, the fourth USB Type-C cable L12. Therefore, transmission of SuperSpeed USB signal or DisplayPort video signal can be conducted between the first host computer H1 and the first USB Type-C connector 101, between the second host computer H2 and the second USB Type-C connector 102, between the first USB Type-C connector 101 and the first USB Type-C switch 105, and/or between the second USB Type-C connector 102 and the second USB Type-C switch 106.

However, it is worth noting that, high-speed signal transmission between the first USB Type-C switch 105 and the video switch 108, between the second USB Type-C switch 106 and the video switch 108, between the first USB Type-C switch 105 and the USB switch 109, between the second USB Type-C switch 106 and the USB switch 109, and/or between the video switch 108 and the video connector 103 is conducted by using one pair of high-speed signal transmitting lanes (i.e., Rx and Tx). That is, the KVM device 100 allows high-speed signal transmission between the USB connector 104 and an external electronic device to be conducted, and also allows high-speed video signal transmission between the video connector 103 and an external display device to be conducted. However, an ultra-high-speed (i.e., super speed) video signal transmission between the external display device and the video connector 103 of the KVM device 100 is failed to be conducted. In other words, although the KVM device 100 can make SuperSpeed signal be transmitted between the first host computer H1 and the second host computer H2, the KVM device 100 fails to make SuperSpeed signal be transmitted between the USB connector 104 and the external electronic device. Moreover, the KVM device 100 also fails to make DisplayPort signal be transmitted between the video connector 103 and the external display device.

From above descriptions, it is understood that there are rooms for improvement in the conventional KVM device. In view of that, the inventor of the present application have made great efforts to make inventive research and eventually provided a KVM device supporting SuperSpeed USB signal and DisplayPort video signal transmitting.

SUMMARY OF THE INVENTION

The primary objective of the present invention is to disclose a KVM device supporting transmission of SuperSpeed USB signal and DisplayPort video signal is disclosed. When using this KVM device, a host electronic device electrically connected to a first USB Type-C connector and a second USB Type-C connector of the KVM device, respectively. Therefore, the KVM device transmits DisplayPort video signal between the host computer and an external display device that is coupled to a video connector of the KVM device. Moreover, the KVM device also transmits SuperSpeed USB signal between the host computer and an external electronic device that is coupled to a USB connector thereof.

For achieving the primary objective mentioned above, the present invention provides an embodiment of the KVM device, comprising;

a first USB Type-C connector, being used to be electrically connected to a host electronic device through a first USB Type-C cable;

a first USB Type-C switch, being coupled to the first USB Type-C connector via a first signal transmitting channel;

a second USB Type-C connector, being used to be electrically connected to the host electronic device through a second USB Type-C cable;

a second USB Type-C switch, being coupled to the second USB Type-C connector via a second signal transmitting channel;

a USB switch, being coupled to the first USB Type-C switch through a third signal transmitting channel, and being coupled to the second USB Type-C switch through a fourth signal transmitting channel;

a video switch, being coupled to the first USB Type-C switch through a fifth signal transmitting channel, and being coupled to the second USB Type-C switch through a sixth signal transmitting channel;

a control unit, being coupled to the first USB Type-C switch, the second USB Type-C switch, the USB switch, and the video switch;

a video connector, being coupled to the video switch through a seventh signal transmitting channel; and at least one USB connector, being coupled to the USB switch through an eighth signal transmitting channel;

wherein a SuperSpeed USB signal is transmitted between the second USB Type-C connector and the host computer via four pairs of SuperSpeed signal transmitting lanes of the second USB Type-C cable, and a DisplayPort video signal being transmitted between the first USB Type-C connector and the host computer via four pairs of SuperSpeed signal transmitting lanes of the first USB Type-C cable;

wherein the second signal transmitting channel, the fourth signal transmitting channel and the eighth signal transmitting channel are all provided with four pairs of SuperSpeed signal transmitting lanes therein, such that the SuperSpeed USB signal is further transmitted between the second USB Type-C connector, the second USB Type-C switch, the USB switch, and the USB connector;

wherein the first signal transmitting channel, the fifth signal transmitting channel, and the seventh signal transmitting channel are all provided with four pairs of SuperSpeed signal transmitting lanes therein, such that the DisplayPort video signal is further transmitted between the first USB Type-C connector, the first USB Type-C switch, the video switch, and the video connector.

In one embodiment, the forgoing USB connector is selected from a group consisting of USB 2.0 connector, USB 3.0 connector, and micro USB connector.

In one embodiment, the forgoing video connector is selected from a group consisting of DisplayPort connector, Mini Displayport connector and USB Type-C connector.

In one embodiment, the DisplayPort video signal is selected from a group consisting of 8K/60 Hz high-definition video signal and 4K/60 Hz high-definition video signal.

In one embodiment, the control unit is a microcontroller.

In one embodiment, the first USB Type-C switch and the second USB Type-C switch are both selected from a group consisting of multiplexer and data selector.

In one embodiment, the video switch and the USB switch are both selected from a group consisting of multiplexer and data selector.

In one embodiment, the host computer H1 is selected from a group consisting of desktop computer, laptop computer, tablet computer, server computer, cloud computing computer, and smartphone.

Moreover, the present invention further provides another one embodiment of the KVM device, comprising;

a first USB Type-C connector, being used to be electrically connected to a host electronic device through a first USB Type-C cable;

a first USB Type-C switch, being coupled to the first USB Type-C connector via a first signal transmitting channel;

a second USB Type-C connector, being used to be electrically connected to the host electronic device through a second USB Type-C cable;

a second USB Type-C switch, being coupled to the second USB Type-C connector via a second signal transmitting channel;

a USB switch, being coupled to the first USB Type-C switch through a third signal transmitting channel, and being coupled to the second USB Type-C switch through a fourth signal transmitting channel;

a control unit, being coupled to the first USB Type-C switch, the second USB Type-C switch, and the USB switch;

a first video connector, being coupled to the first USB Type-C switch through a fifth signal transmitting channel;

a second video connector, being coupled to the second USB Type-C switch through a sixth signal transmitting channel; and at least one USB connector, being coupled to the USB switch through a seventh signal transmitting channel;

wherein a SuperSpeed USB signal is transmitted between the second USB Type-C connector and the host computer via four pairs of SuperSpeed signal transmitting lanes of the second USB Type-C cable, and a DisplayPort video signal being transmitted between the first USB Type-C connector and the host computer via four pairs of SuperSpeed signal transmitting lanes of the first USB Type-C cable;

wherein the second signal transmitting channel, the fourth signal transmitting channel and the seventh signal transmitting channel are all provided with four pairs of SuperSpeed signal transmitting lanes therein, such that the SuperSpeed USB signal is further transmitted between the second USB Type-C connector, the second USB Type-C switch, the USB switch, and the USB connector;

wherein the first signal transmitting channel and the fifth signal transmitting channel are both provided with four pairs of SuperSpeed signal transmitting lanes therein, such that the DisplayPort video signal is further transmitted between the first USB Type-C connector, the first USB Type-C switch and the first video connector.

In one embodiment, the forgoing first video connector is selected from a group consisting of DisplayPort connector, Mini Displayport connector and USB Type-C connector.

In one embodiment, the second video connector is selected from a group consisting of HDMI connector, Mini HDMI connector and Micro HDMI.

In one embodiment, the control unit is a microcontroller.

In one embodiment, the first USB Type-C switch and the second USB Type-C switch are both selected from a group consisting of multiplexer and data selector.

In one embodiment, the USB switch is selected from a group consisting of multiplexer and data selector.

In one embodiment, the host computer is selected from a group consisting of desktop computer, laptop computer, tablet computer, server computer, cloud computing computer, and smartphone.

In one embodiment, the DisplayPort video signal is selected from a group consisting of 8K/60 Hz high-definition video signal and 4K/60 Hz high-definition video signal.

In one embodiment, the USB connector is selected from a group consisting of USB 2.0 connector, USB 3.0 connector, and micro USB connector.

BRIEF DESCRIPTION OF THE DRAWINGS

The invention as well as a preferred mode of use and advantages thereof will be best understood by referring to the following detailed description of an illustrative embodiment in conjunction with the accompanying drawings, wherein.

DETAILED DESCRIPTION OF THE PREFERRED EMBODIMENTS

To more clearly describe a KVM device supporting transmission of super speed USB signal and DisplayPort video signal disclosed by the present invention, embodiments of the present invention will be described in detail with reference to the attached drawings hereinafter.

First Embodiment

Figure 1:
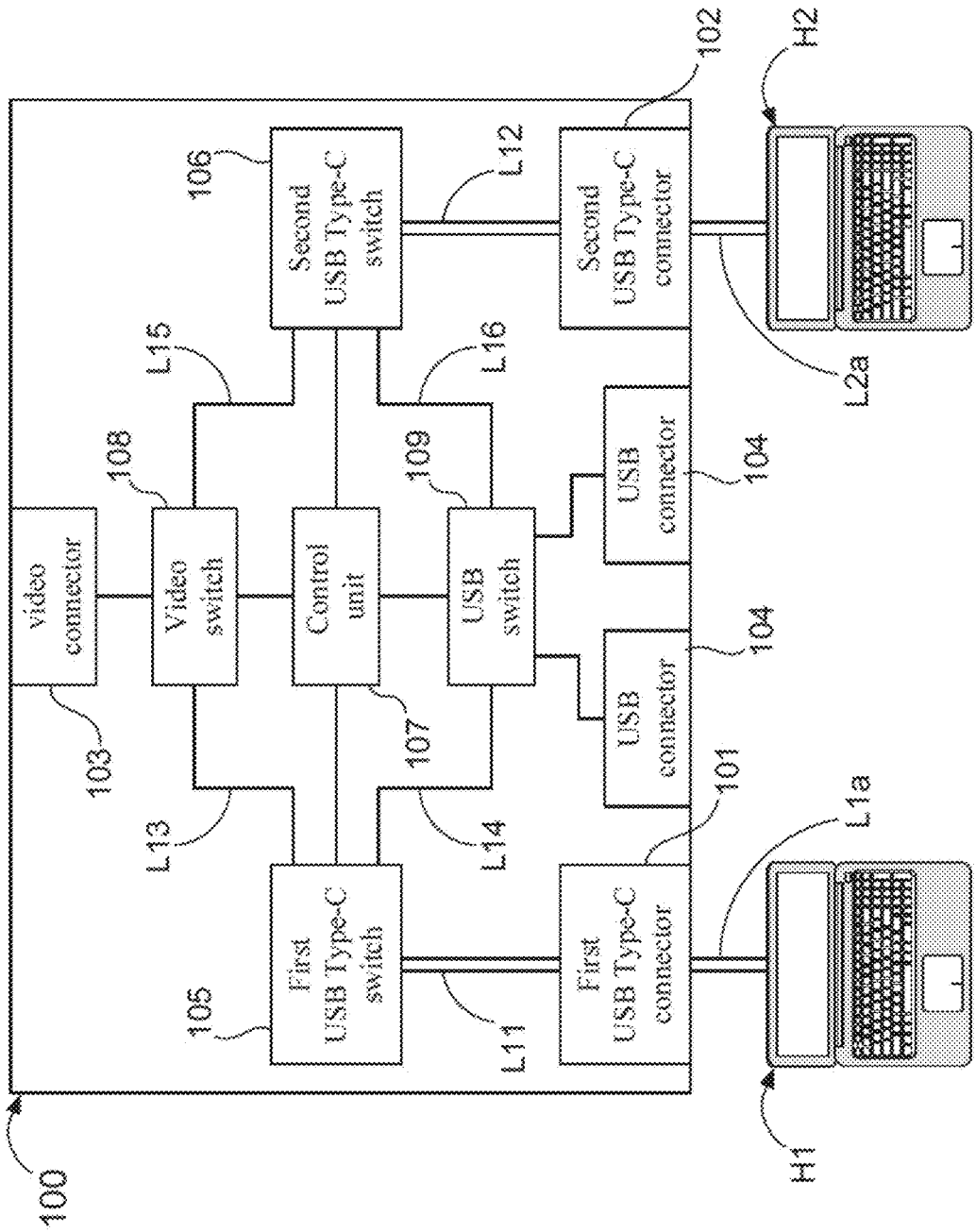
FIG. 1 shows a block diagram of a conventional KVM device including USB Type-C interface.
Figure 2:
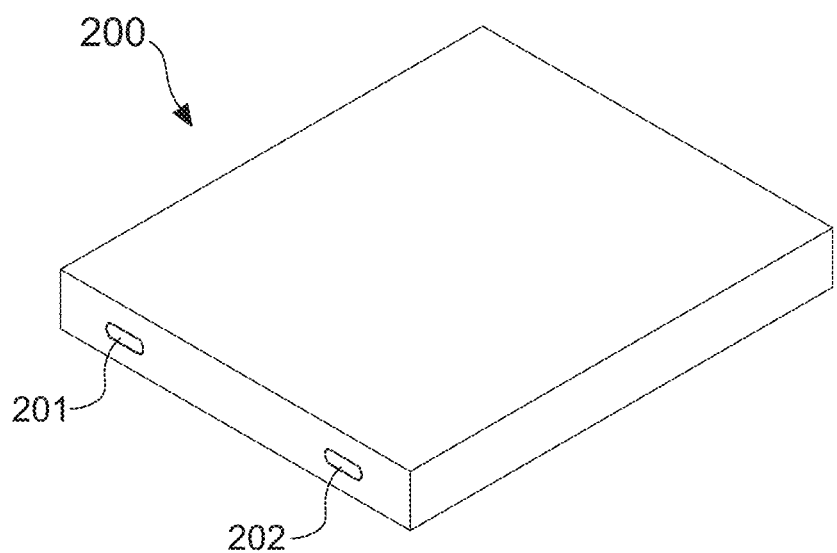
FIG. 2 shows a first stereo diagram of a KVM device supporting transmission of super speed USB signal and DisplayPort video signal according to the present invention.
Figure 3:
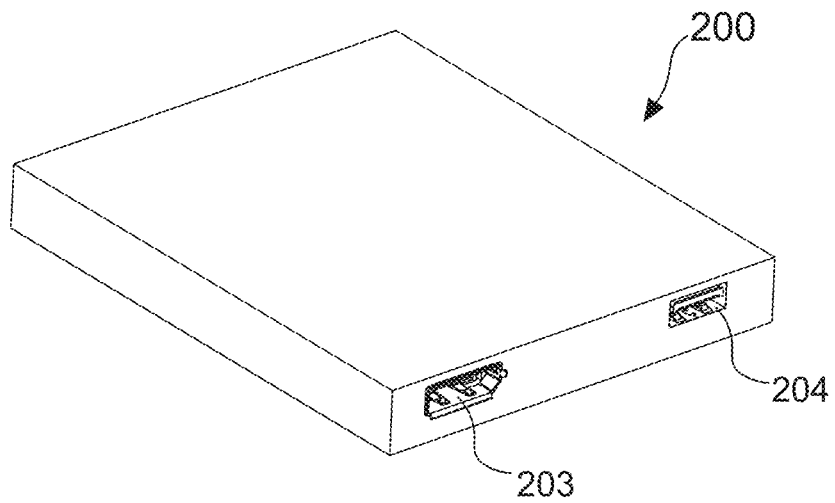
FIG. 3 shows a second stereo diagram of the KVM device supporting transmission of super speed USB signal and DisplayPort video signal according to the present invention.
Figure 4:
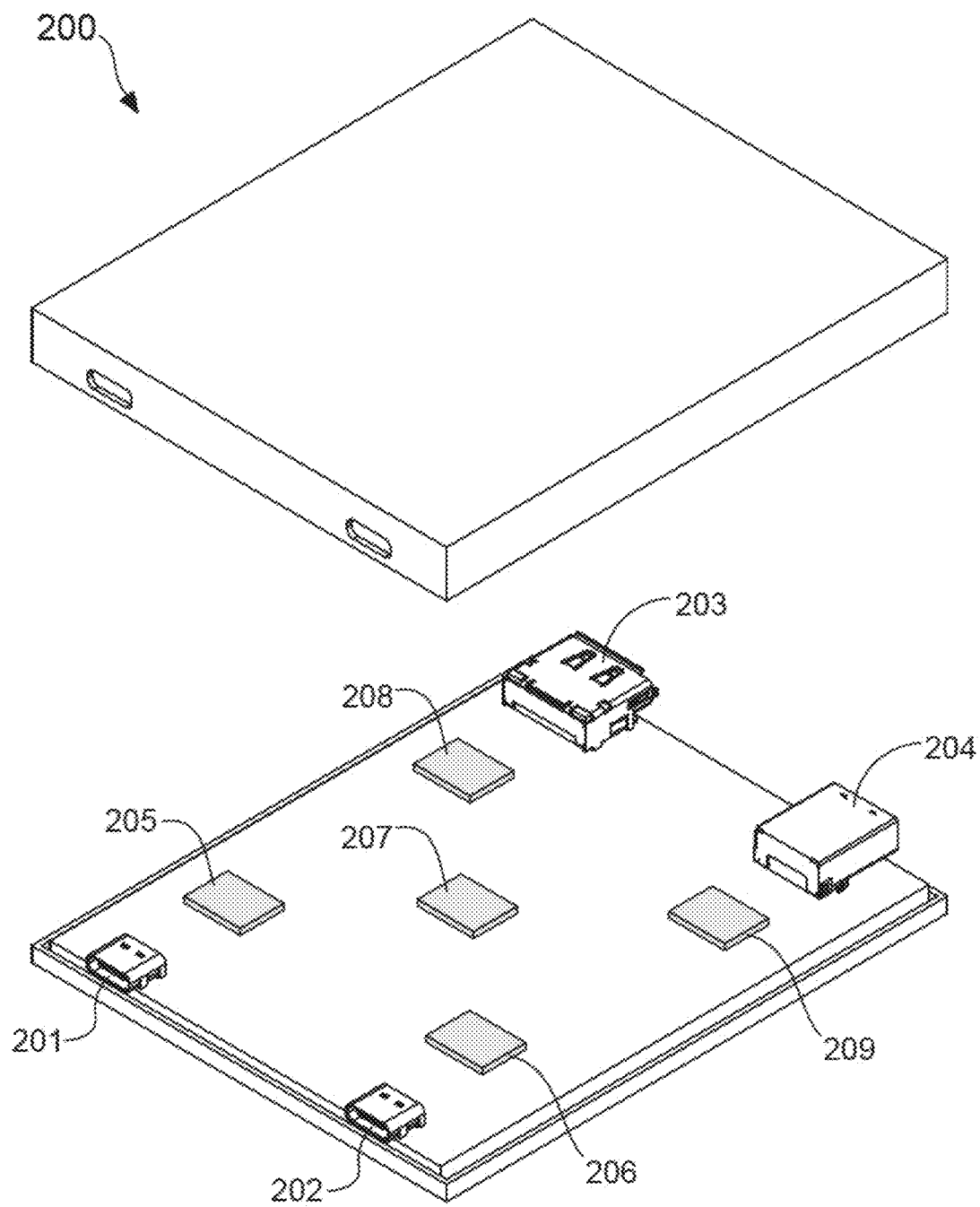
FIG. 4 shows a first exploded view of the KVM device supporting transmission of super speed USB signal and DisplayPort video signal according to the present invention.
Figure 5:
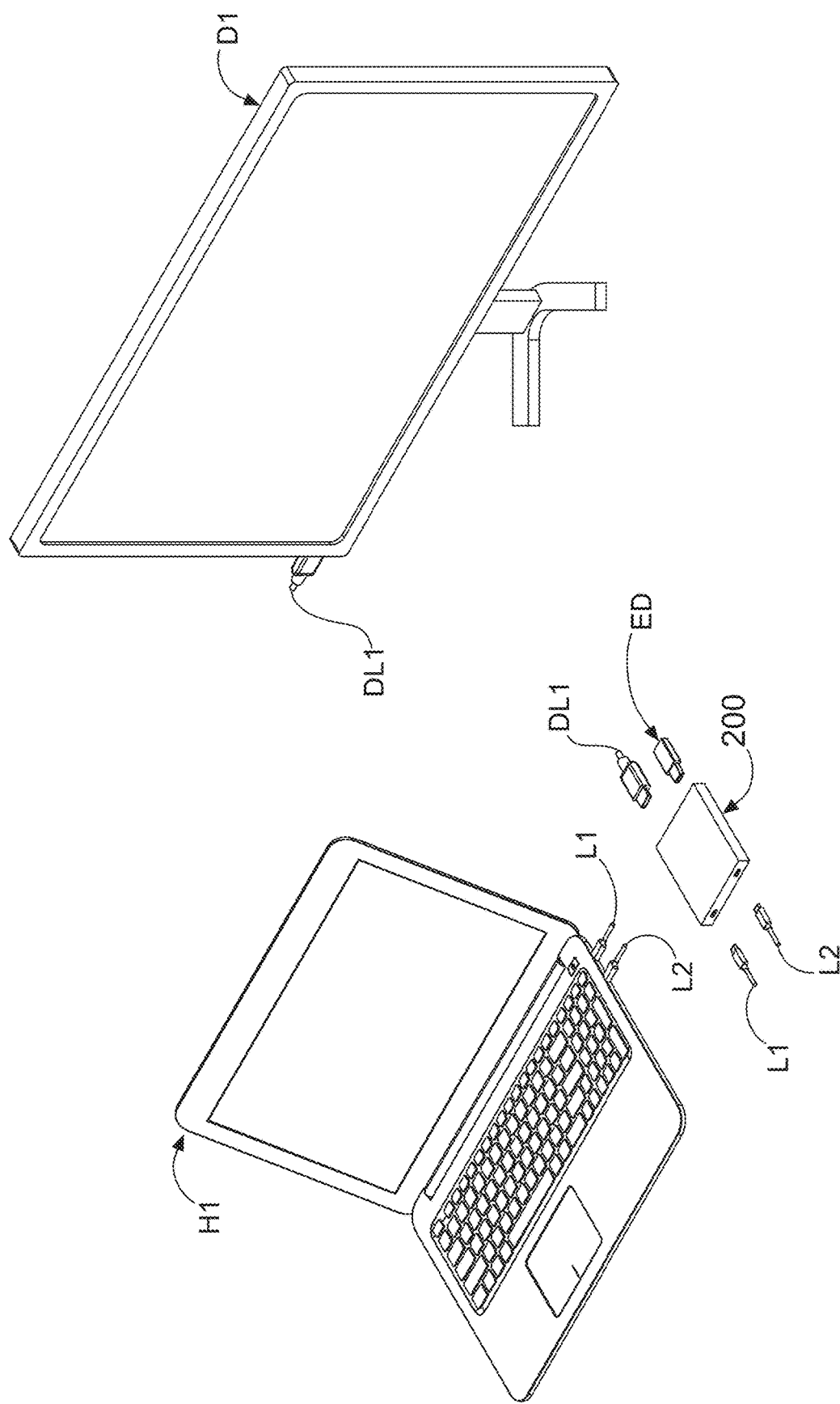
FIG. 5 shows a diagram for describing a first application of the KVM device.

With reference to FIG. 2 and FIG. 3, there are respectively shown a first stereo diagram and a second stereo diagram of a KVM device supporting transmission of super speed USB signal and DisplayPort video signal according to the present invention. Moreover, in FIG. 4, a first exploded view of the KVM device according to the present invention is provided. Furthermore, FIG. 5 shows a diagram for describing a first application of the KVM device. In first embodiment, the KVM device 200 comprises a first USB Type-C connector 201, a first USB Type-C switch 205, a second USB Type-C connector 202, a second USB Type-C switch 206, a USB switch 209, a video switch 208, a control unit 207, a video connector 203, and at least one USB connector 204. When using this KVM device 200, the first USB Type-C connector 201 and the second USB Type-C connector 202 are electrically connected to a host electronic device H1 through a first USB Type-C cable L1 and a second USB Type-C cable L2, respectively. Therefore, the KVM device 200 transmits DisplayPort video signal between the host computer H1 and an external first display device D1 that is coupled to the video connector 203. Moreover, the KVM device 200 also transmits SuperSpeed USB signal between the host computer H1 and an external electronic device ED that is coupled to the USB connector 204.

Figure 6:
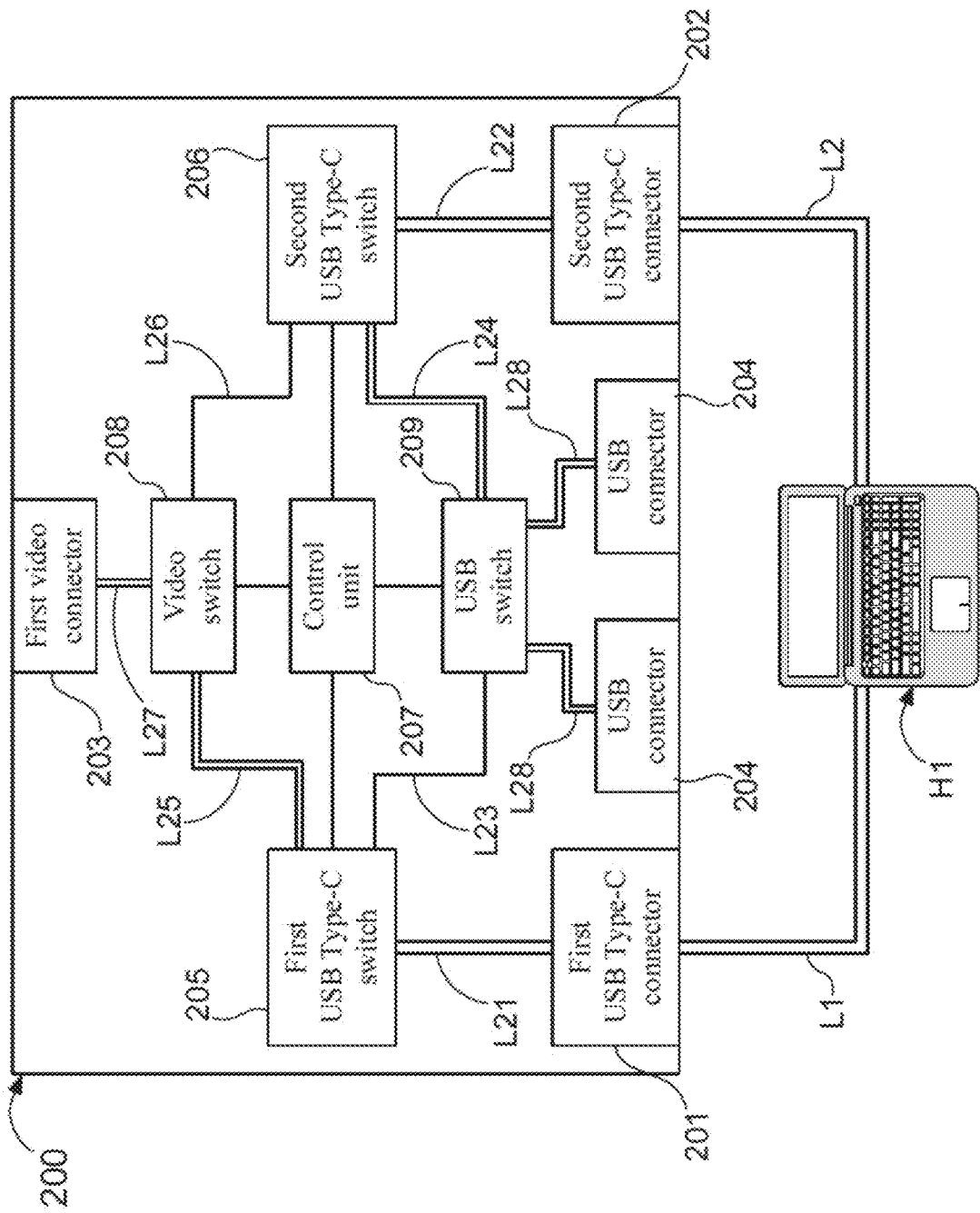
FIG. 6 shows a first block diagram of the KVM device supporting transmission of super speed USB signal and DisplayPort video signal according to the present invention.

Continuously referring to FIG. 2, FIG. 3, FIG. 4, and FIG. 5, and please simultaneously refer to FIG. 6, which shows a first block diagram of the KVM device. According to the present invention, the first USB Type-C connector 201 is used to be electrically connected to the host electronic device H1 through a first USB Type-C cable L1, and the first USB Type-C switch 205 is coupled to the first USB Type-C connector 201 via a first signal transmitting channel L21. Similarly, the second USB Type-C connector 202 is also used to be electrically connected to the host electronic device H1 through a second USB Type-C cable L2, and the second USB Type-C switch 206 is coupled to the second USB Type-C connector 202 via a second signal transmitting channel L22. In practicable embodiments, both the first USB Type-C switch 205 and the second USB Type-C switch 206 can be a multiplexer or a data selector.

As described in more detail below, the USB switch 209 is coupled to the first USB Type-C switch 205 through a third signal transmitting channel L23, and is simultaneously coupled to the second USB Type-C switch 206 through a fourth signal transmitting channel L24. On the other hand, the video switch 208 is coupled to the first USB Type-C switch 205 through a fifth signal transmitting channel L25, and is simultaneously coupled to the second USB Type-C switch 206 through a sixth signal transmitting channel L26. In practicable embodiments, both the video switch 208 and the USB switch 209 can be a multiplexer or a data selector.

Moreover, the control unit 207 is coupled to the first USB Type-C switch 205, the second USB Type-C switch 206, the USB switch 209, and the video switch 208, the video connector 203 is coupled to the video switch 208 through a seventh signal transmitting channel L27, and the two USB connectors 204 are both coupled to the USB switch 209 through an eighth signal transmitting channel L28. In practicable embodiments, the control unit 207 can be a microcontroller, and the video connector 203 can be a DisplayPort connector, a Mini Displayport connector or a USB Type-C connector. On the other hand, the USB connector 204 can be a USB 2.0 connector, a USB 3.0 connector, or a micro USB connector.

After the host computer is electrically connected to the first USB Type-C connector 201 and the second USB Type-C connector 201 through the first USB Type-C cable L1 and the second USB Type-C cable L2, a SuperSpeed USB signal is transmitted between the second USB Type-C connector 202 and the host computer H1 via four pairs of SuperSpeed signal transmitting lanes of the second USB Type-C cable L2, and a DisplayPort video signal being transmitted between the first USB Type-C connector 201 and the host computer H1 via four pairs of SuperSpeed signal transmitting lanes of the first USB Type-C cable L1.

Particularly, according to the present invention, the second signal transmitting channel L22, the fourth signal transmitting channel L24 and the eighth signal transmitting channel L28 are all provided with four pairs of SuperSpeed signal transmitting lanes therein, such that the SuperSpeed USB signal is further transmitted between the second USB Type-C connector 202, the second USB Type-C switch 206, the USB switch 209, and the USB connector 204. Therefore, the KVM device 200 transmits the SuperSpeed USB signal between the host computer H1 and an external electronic device ED that is coupled to the USB connector 204.

Moreover, according to the present invention, the first signal transmitting channel L21, the fifth signal transmitting channel L25, and the seventh signal transmitting channel L27 are all provided with four pairs of SuperSpeed signal transmitting lanes therein, such that the DisplayPort video signal is further transmitted between the first USB Type-C connector 201, the first USB Type-C switch 205, the video switch 208, and the video connector 203. As FIG. 5 shows, the first display device D1 is electrically connected to the video connector 203 through a first DisplayPort cable DL1. Therefore, the KVM device 200 transmits the DisplayPort video signal between the host computer and the first display device D1. Herein, it is worth explaining that, the said DisplayPort video signal means a 8K/60 Hz high-definition video signal or a 4K/60 Hz high-definition video signal. On the other hand, in spite of the fact that FIG. 5 depicts that the host computed is a laptop computer, the host computer H1 is not limited to be the laptop computer. In practicable embodiments, the host computer H1 can be a desktop computer, a laptop computer, a tablet computer, a server computer, a cloud computing computer, or a smartphone.

Second Embodiment

Figure 7:
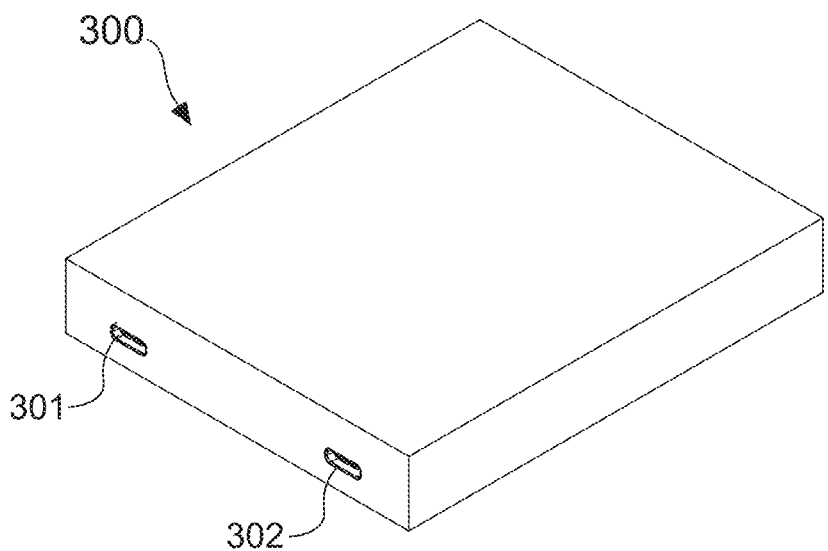
FIG. 7 shows a third stereo diagram of the KVM device supporting transmission of super speed USB signal and DisplayPort video signal according to the present invention.
Figure 8:
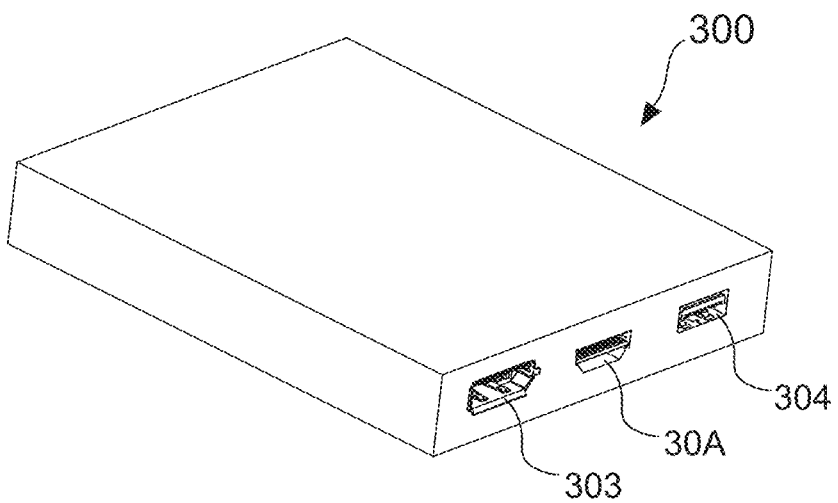
FIG. 8 shows a fourth stereo diagram of the KVM device supporting transmission of super speed USB signal and DisplayPort video signal according to the present invention.
Figure 9:
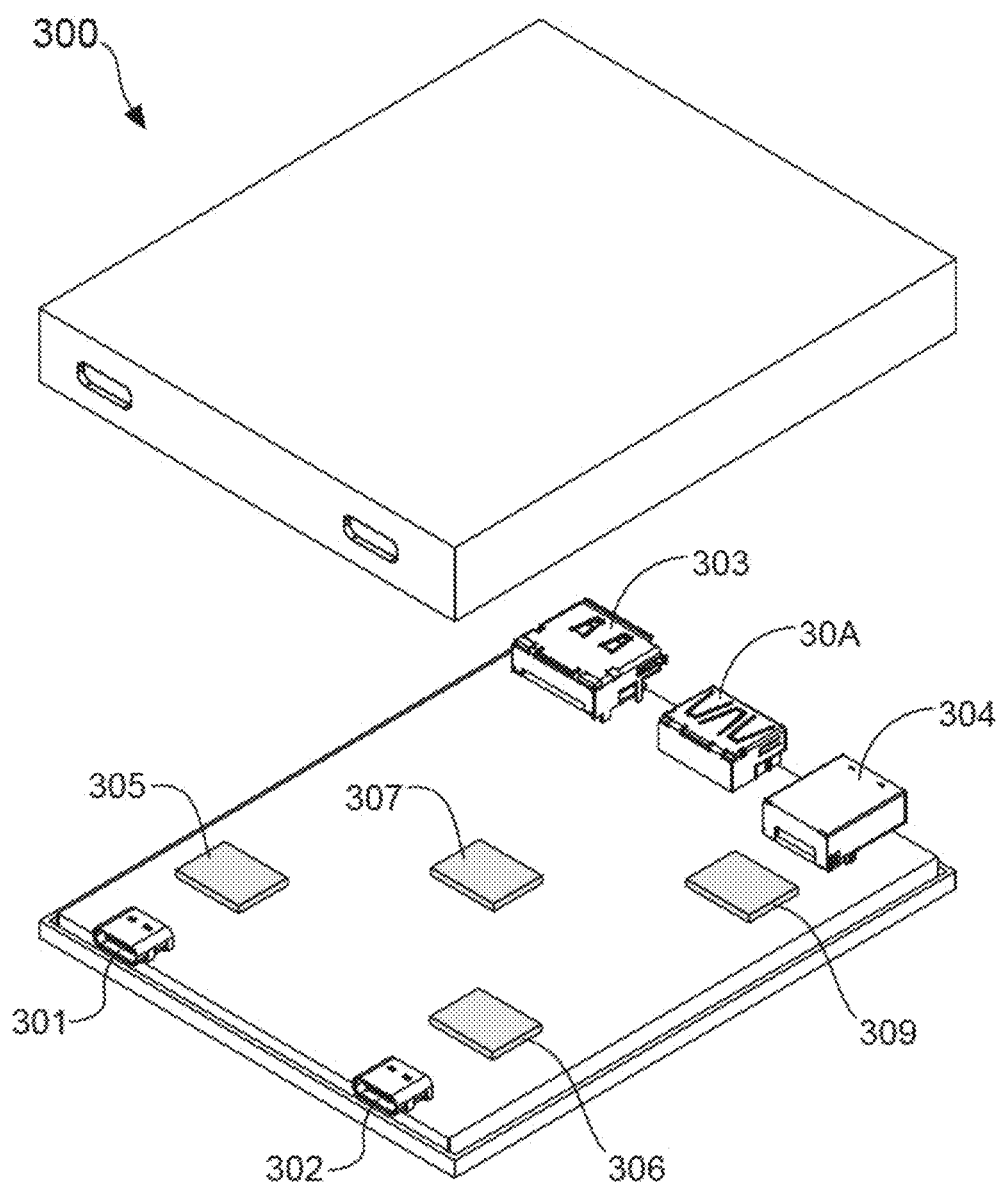
FIG. 9 shows a second exploded view of the KVM device supporting transmission of super speed USB signal and DisplayPort video signal according to the present invention.
Figure 10:
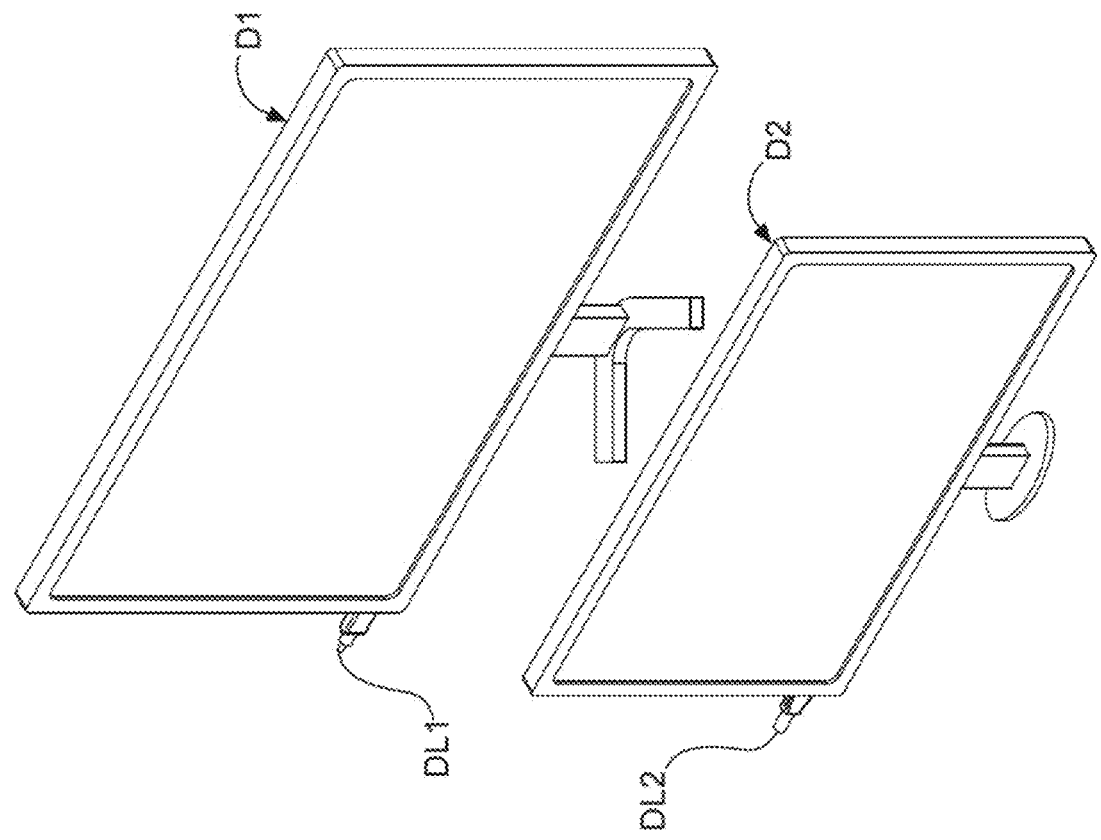
FIG. 10 shows a diagram for describing a second application of the KVM device.
Figure 10:
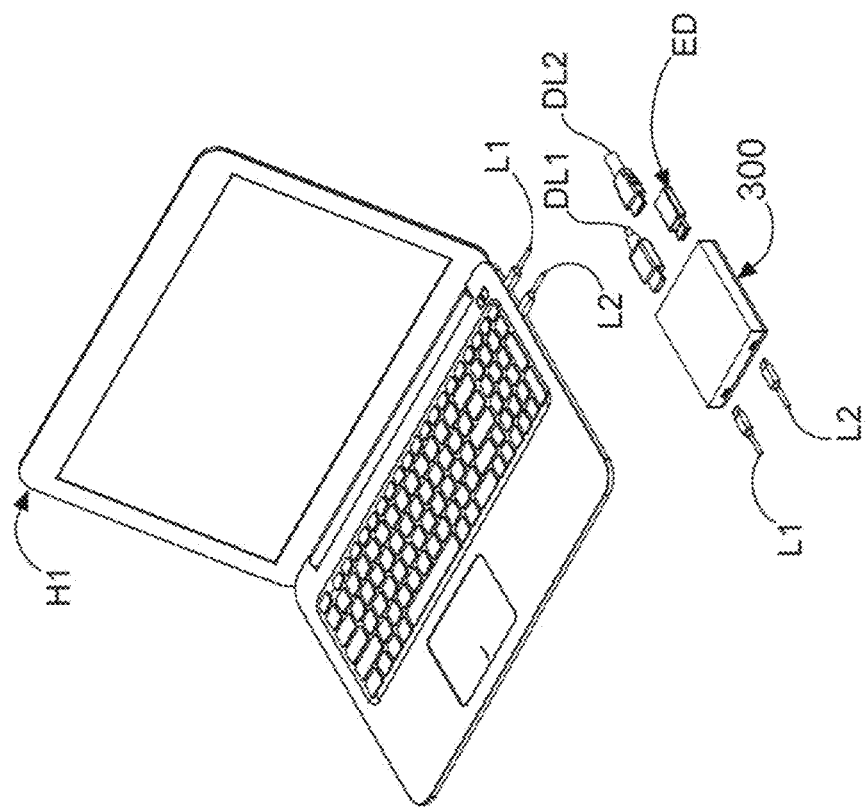

With reference to FIG. 7 and FIG. 8, there are respectively shown a third stereo diagram and a fourth stereo diagram of a KVM device supporting transmission of super speed USB signal and DisplayPort video signal according to the present invention. Moreover, in FIG. 9, a second exploded view of the KVM device according to the present invention is provided. Furthermore, FIG. 10 shows a diagram for describing a second application of the KVM device. In second embodiment, the KVM device 300 comprises a first USB Type-C connector 301, a first USB Type-C switch 305, a second USB Type-C connector 302, a second USB Type-C switch 306, a USB switch 309, a control unit 307, a first video connector 303, a second video connector 30A, and at least one USB connector 304. When using this KVM device 300, the first USB Type-C connector 301 and the second USB Type-C connector 302 are electrically connected to a host electronic device H1 through a first USB Type-C cable L1 and a second USB Type-C cable L2, respectively. Therefore, the KVM device 300 transmits DisplayPort video signal between the host computer H1 and an external first display device D1 that is coupled to the first video connector 303. Moreover, the KVM device 300 also transmits SuperSpeed USB signal between the host computer H1 and an external electronic device ED that is coupled to the USB connector 304. Furthermore, the KVM device 300 also transmits video signal between the host computer H1 and an external second display device D2 that is coupled to the second video connector 30A.

Figure 11:
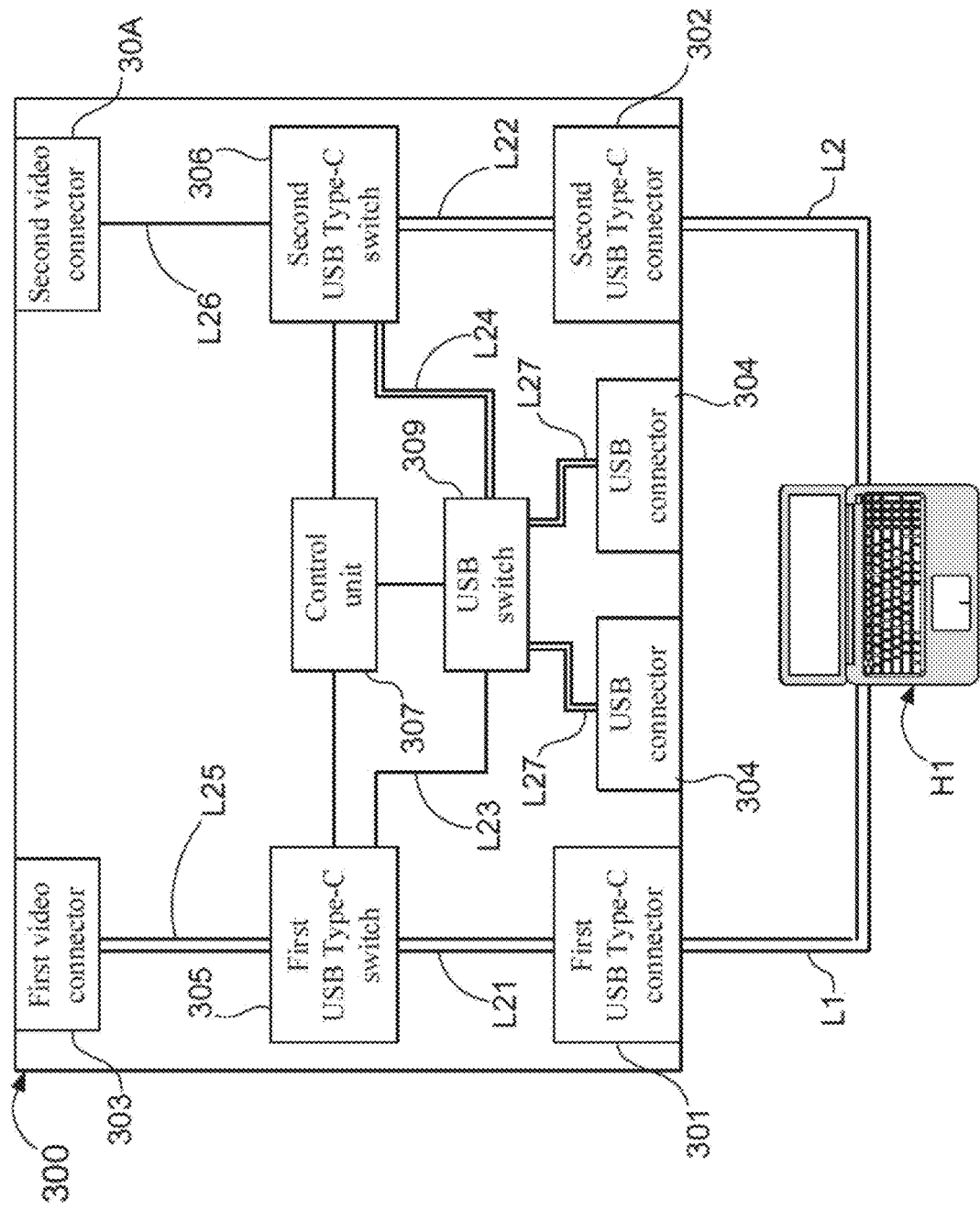
FIG. 11 shows a second diagram of the KVM device supporting transmission of super speed USB signal and DisplayPort video signal according to the present invention.

Continuously referring to FIG. 7, FIG. 8, FIG. 9, and FIG. 10, and please simultaneously refer to FIG. 11, which shows a second block diagram of the KVM device. According to the present invention, the first USB Type-C connector 301 is used to be electrically connected to the host electronic device H1 through a first USB Type-C cable L1, and the first USB Type-C switch 305 is coupled to the first USB Type-C connector 301 via a first signal transmitting channel L21. Similarly, the second USB Type-C connector 302 is also used to be electrically connected to the host electronic device H1 through a second USB Type-C cable L2, and the second USB Type-C switch 306 is coupled to the second USB Type-C connector 302 via a second signal transmitting channel L22. In practicable embodiments, both the first USB Type-C switch 305 and the second USB Type-C switch 306 can be a multiplexer or a data selector.

As described in more detail below, the USB switch 309 is coupled to the first USB Type-C switch 305 through a third signal transmitting channel L23, and being coupled to the second USB Type-C switch 306 through a fourth signal transmitting channel L24. In practicable embodiments, the USB switch 309 can be a multiplexer or a data selector. On the other hand, the first video connector 303, being coupled to the first USB Type-C switch 305 through a fifth signal transmitting channel L25, and the second video connector 30A is coupled to the second USB Type-C switch 306 through a sixth signal transmitting channel L26.

Moreover, the control unit 307 is coupled to the first USB Type-C switch 305, the second USB Type-C switch 306, and the USB switch 309, and both the two USB connector 304 are coupled to the USB switch 309 through a seventh signal transmitting channel L27. In practicable embodiments, the control unit 307 can be a microcontroller, and the first video connector 303 can be a DisplayPort connector, a Mini Displayport connector or a USB Type-C connector. On the other hand, the USB connector 304 can be a USB 2.0 connector, a USB 3.0 connector, or a micro USB connector. In addition, the second video connector 30A can be a HDMI connector, a Mini HDMI connector or a Micro HDMI connector.

After the host computer is electrically connected to the first USB Type-C connector 301 and the second USB Type-C connector 301 through the first USB Type-C cable L1 and the second USB Type-C cable L2, a SuperSpeed USB signal is transmitted between the second USB Type-C connector 302 and the host computer H1 via four pairs of SuperSpeed signal transmitting lanes of the second USB Type-C cable L2, and a DisplayPort video signal being transmitted between the first USB Type-C connector 301 and the host computer H1 via four pairs of SuperSpeed signal transmitting lanes of the first USB Type-C cable L1.

Particularly, according to the present invention, the second signal transmitting channel L22, the fourth signal transmitting channel L24 and the seventh signal transmitting channel L27 are all provided with four pairs of SuperSpeed signal transmitting lanes therein, such that the SuperSpeed USB signal is further transmitted between the second USB Type-C connector 302, the second USB Type-C switch 306, the USB switch 309, and the USB connector 304. Therefore, the KVM device 300 transmits the SuperSpeed USB signal between the host computer H1 and an external electronic device ED that is coupled to the USB connector 304.

Moreover, according to the present invention, the first signal transmitting channel L21 and the fifth signal transmitting channel L25 are both provided with four pairs of SuperSpeed signal transmitting lanes therein, such that the DisplayPort video signal is further transmitted between the first USB Type-C connector 301, the first USB Type-C switch 305 and the first video connector 303. In addition, a video signal is transmitted between the first USB Type-C switch 305, the USB switch 309, the second USB Type-C switch 306, and the second video connector 30A. As FIG. 10 shows, the first display device D1 is electrically connected to the first video connector 303 through a first DisplayPort cable DL1, and the second display device D2 is electrically connected to the second video connector 30A through a video cable DL2. Therefore, the KVM device 300 transmits the DisplayPort video signal between the host computer H1 and the first display device D1. Herein, it is worth explaining that, the said DisplayPort video signal means a 8K/60 Hz high-definition video signal or a 4K/60 Hz high-definition video signal. Moreover, the KVM device 300 also transmits the video signal between the host computer H1 and the second display device D2.

Therefore, through the above descriptions, all embodiments of the KVM device supporting transmission of Super-Speed USB signal (e.g., USB 3.0/3.1) and DisplayPort video signal (e.g., DisplayPort 1.3/1.4) according to the present invention have been introduced completely and clearly. Moreover, the above description is made on embodiments of the present invention. However, the embodiments are not intended to limit the scope of the present invention, and all equivalent implementations or alterations within the spirit of the present invention still fall within the scope of the present invention.

What is claimed is:

1. A KVM device, comprising:
   a first USB Type-C connector, being used to be electrically connected to a host electronic device through a first USB Type-C cable;
   a first USB Type-C switch, being coupled to the first USB Type-C connector via a first signal transmitting channel;
   a second USB Type-C connectors, being used to be electrically connected to the host electronic device through a second USB Type-C cable;
   a second USB Type-C switch, being coupled to the second USB Type-C connector via a second signal transmitting channel;
   a USB switch, being coupled to the first USB Type-C switch through a third signal transmitting channel, and being coupled to the second USB Type-C switch through a fourth signal transmitting channel;
   a video switch, being coupled to the first USB Type-C switch through a fifth signal transmitting channel, and being coupled to the second USB Type-C switch through a sixth signal transmitting channel;
   a control unit, being coupled to the first USB Type-C switch, the second USB Type-C switch, the USB switch, and the video switch;
   a video connector, being coupled to the video switch through a seventh signal transmitting channel; and
   at least one USB connector, being coupled to the USB switch through an eighth signal transmitting channel;
   wherein a SuperSpeed USB signal is transmitted between the second USB Type-C connector and the host computer via four pairs of SuperSpeed signal transmitting lanes of the second USB Type-C cable, and a DisplayPort video signal being transmitted between the first USB Type-C connector and the host computer via four pairs of SuperSpeed signal transmitting lanes of the first USB Type-C cable;
   wherein the second signal transmitting channel, the fourth signal transmitting channel and the eighth signal transmitting channel are all provided with four pairs of SuperSpeed signal transmitting lanes therein, such that the SuperSpeed USB signal is further transmitted between the second USB Type-C connector, the second USB Type-C switch, the USB switch, and the USB connector;
   wherein the first signal transmitting channel, the fifth signal transmitting channel, and the seventh signal transmitting channel are all provided with four pairs of SuperSpeed signal transmitting lanes therein, such that the DisplayPort video signal is further transmitted between the first USB Type-C connector, the first USB Type-C switch, the video switch, and the video connector.

2. The KVM device of claim 1, wherein the video connector is selected from a group consisting of DisplayPort connector, Mini Displayport connector and USB Type-C connector.

3. The KVM device of claim 1, wherein the control unit is a microcontroller.

4. The KVM device of claim 1, wherein the first USB Type-C switch and the second USB Type-C switch are both selected from a group consisting of multiplexer and data selector.

5. The KVM device of claim 1, wherein the video switch and the USB switch are both selected from a group consisting of multiplexer and data selector.

6. The KVM device of claim 1, wherein the host computer is selected from a group consisting of desktop computer, laptop computer, tablet computer, server computer, cloud computing computer, and smartphone.

7. The KVM device of claim 1, wherein the DisplayPort video signal is selected from a group consisting of 8K/60 Hz high-definition video signal and 4K/60 Hz high-definition video signal.

8. The KVM device of claim 1, wherein the USB connector is selected from a group consisting of USB 2.0 connector, USB 3.0 connector, and micro USB connector.

9. A KVM device, comprising:
   a first USB Type-C connector, being used to be electrically connected to a host electronic device through a first USB Type-C cable;
   a first USB Type-C switch, being coupled to the first USB Type-C connector via a first signal transmitting channel;
   a second USB Type-C connector, being used to be electrically connected to the host electronic device through a second USB Type-C cable;
   a second USB Type-C switch, being coupled to the second USB Type-C connector via a second signal transmitting channel;
   a USB switch, being coupled to the first USB Type-C switch through a third signal transmitting channel, and being coupled to the second USB Type-C switch through a fourth signal transmitting channel;
   a control unit, being coupled to the first USB Type-C switch, the second USB Type-C switch, and the USB switch;
   a first video connector, being coupled to the first USB Type-C switch through a fifth signal transmitting channel;
   a second video connector, being coupled to the second USB Type-C switch through a sixth signal transmitting channel; and
   at least one USB connector, being coupled to the USB switch through a seventh signal transmitting channel;
   wherein a SuperSpeed USB signal is transmitted between the second USB Type-C connector and the host computer via four pairs of SuperSpeed signal transmitting lanes of the second USB Type-C cable, and a DisplayPort video signal being transmitted between the first USB Type-C connector and the host computer via four pairs of SuperSpeed signal transmitting lanes of the first USB Type-C cable;

wherein the second signal transmitting channel, the fourth signal transmitting channel and the seventh signal transmitting channel are all provided with four pairs of SuperSpeed signal transmitting lanes therein, such that the SuperSpeed USB signal is further transmitted between the second USB Type-C connector, the second USB Type-C switch, the USB switch, and the USB connector;

wherein the first signal transmitting channel and the fifth signal transmitting channel are both provided with four pairs of SuperSpeed signal transmitting lanes therein, such that the DisplayPort video signal is further transmitted between the first USB Type-C connector, the first USB Type-C switch and the first video connector.

10. The KVM device of claim 9, wherein the first video connector is selected from a group consisting of DisplayPort connector, Mini Displayport connector and USB Type-C connector.

11. The KVM device of claim 9, wherein the second video connector is selected from a group consisting of HDMI connector, Mini HDMI connector and Micro HDMI connector.

12. The KVM device of claim 9, wherein the control unit is a microcontroller.

13. The KVM device of claim 9, wherein the first USB Type-C switch and the second USB Type-C switch are both selected from a group consisting of multiplexer and data selector.

14. The KVM device of claim 9, wherein the USB switch is selected from a group consisting of multiplexer and data selector.

15. The KVM device of claim 9, wherein the host computer is selected from a group consisting of desktop computer, laptop computer, tablet computer, server computer, cloud computing computer, and smartphone.

16. The KVM device of claim 9, wherein the DisplayPort video signal is selected from a group consisting of 8K/60 Hz high-definition video signal and 4K/60 Hz high-definition video signal.

17. The KVM device of claim 9, wherein the USB connector is selected from a group consisting of USB 2.0 connector, USB 3.0 connector, and micro USB connector.

* * * * *